US012423907B2

United States Patent
Lui et al.

(10) Patent No.: US 12,423,907 B2
(45) Date of Patent: Sep. 23, 2025

(54) DISPLAYING A RENDERED VOLUMETRIC REPRESENTATION ACCORDING TO DIFFERENT DISPLAY MODES

(71) Applicant: Apple Inc., Cupertino, CA (US)

(72) Inventors: David Lui, San Jose, CA (US); Xiao Jin Yu, Sunnyvale, CA (US); Tyler L. Casella, San Mateo, CA (US); Hon-Ming Chen, San Jose, CA (US); Shuai Song, Fremont, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/850,077

(22) Filed: Jun. 27, 2022

(65) Prior Publication Data

US 2023/0065077 A1 Mar. 2, 2023

Related U.S. Application Data

(60) Provisional application No. 63/239,332, filed on Aug. 31, 2021.

(51) Int. Cl.
*G06T 15/08* (2011.01)
*G06T 19/00* (2011.01)

(52) U.S. Cl.
CPC ............ *G06T 15/08* (2013.01); *G06T 19/006* (2013.01)

(58) Field of Classification Search
CPC ... G06T 15/08; G06T 19/006; G06T 2200/24; G06T 11/60
See application file for complete search history.

(56) References Cited

U.S. PATENT DOCUMENTS

| | | | |
|---|---|---|---|
| 10,163,261 B2 | 12/2018 | Bell et al. | |
| 10,643,387 B2 | 5/2020 | Sakamoto et al. | |
| 10,777,017 B1* | 9/2020 | Saiger | G06F 16/951 |
| 2003/0231191 A1* | 12/2003 | Glen | G09G 5/363 |
| | | | 348/E9.024 |
| 2018/0203951 A1* | 7/2018 | Jovanovic | G06T 15/10 |
| 2021/0081579 A1 | 3/2021 | Jovanovic | |
| 2021/0183154 A1* | 6/2021 | Canada | G06T 11/00 |

* cited by examiner

*Primary Examiner* — Amit Chatly
(74) *Attorney, Agent, or Firm* — Fernando & Partners, LLP

(57) ABSTRACT

A method is performed at an electronic device including one or more processors, a non-transitory memory, and a display. The method includes rendering a first volumetric object in order to generate first object data. The method includes displaying, on the display, the first object data according to a first display mode. The first display mode includes displaying the first object data within a two-dimensional (2D) content region. The method includes detecting a request to change from the first display mode to a second display mode. The method includes, in response to detecting the request, displaying, on the display, the first object data according to the second display mode. The second display mode includes displaying the first object data within a representation of a physical environment.

19 Claims, 14 Drawing Sheets

DISPLAYING A RENDERED VOLUMETRIC REPRESENTATION ACCORDING TO DIFFERENT DISPLAY MODES

CROSS-REFERENCE TO RELATED APPLICATIONS

This application claims priority to U.S. Provisional Patent App. No. 63/239,332, filed on Aug. 31, 2021, and hereby incorporated by reference in its entirety.

TECHNICAL FIELD

The present disclosure relates to displaying content, and in particular displaying volumetric content according to various display modes.

BACKGROUND

A device may display a two-dimensional (2D) content item within a 2D content region of the display. In some circumstances, the device generates and displays a volumetric representation of the 2D content item. Generating a volumetric representation of a 2D content item includes a complex rendering process, which is computationally expensive and time consuming. In various circumstances, the device initiates the rendering process in response to receiving a display request. Accordingly, a relatively large delay is associated with the transition between reception of the display request, generation of a volumetric representation, and display of the volumetric representation. The relatively large delay often results in the display of undesirable visual artifacts, thereby degrading the user experience.

SUMMARY

In accordance with some implementations, a method is performed at an electronic device with one or more processors, a non-transitory memory, and a display. The method includes rendering a first volumetric object in order to generate first object data. The method includes displaying, on the display, the first object data according to a first display mode. The first display mode includes displaying the first object data within a 2D content region. The method includes detecting a request to change from the first display mode to a second display mode. The method includes, in response to detecting the request, displaying, on the display, the first object data according to the second display mode. The second display mode includes displaying the first object data within a representation of a physical environment.

In accordance with some implementations, an electronic device includes one or more processors, a non-transitory memory, and a display. The one or more programs are stored in the non-transitory memory and configured to be executed by the one or more processors and the one or more programs include instructions for performing or causing performance of the operations of any of the methods described herein. In accordance with some implementations, a non-transitory computer readable storage medium has stored therein instructions which when executed by one or more processors of an electronic device, cause the device to perform or cause performance of the operations of any of the methods described herein. In accordance with some implementations, an electronic device includes means for performing or causing performance of the operations of any of the methods described herein. In accordance with some implementations, an information processing apparatus, for use in an electronic device, includes means for performing or causing performance of the operations of any of the methods described herein.

BRIEF DESCRIPTION OF THE DRAWINGS

For a better understanding of the various described implementations, reference should be made to the Description, below, in conjunction with the following drawings in which like reference numerals refer to corresponding parts throughout the figures.

DESCRIPTION OF IMPLEMENTATIONS

Figure 1:
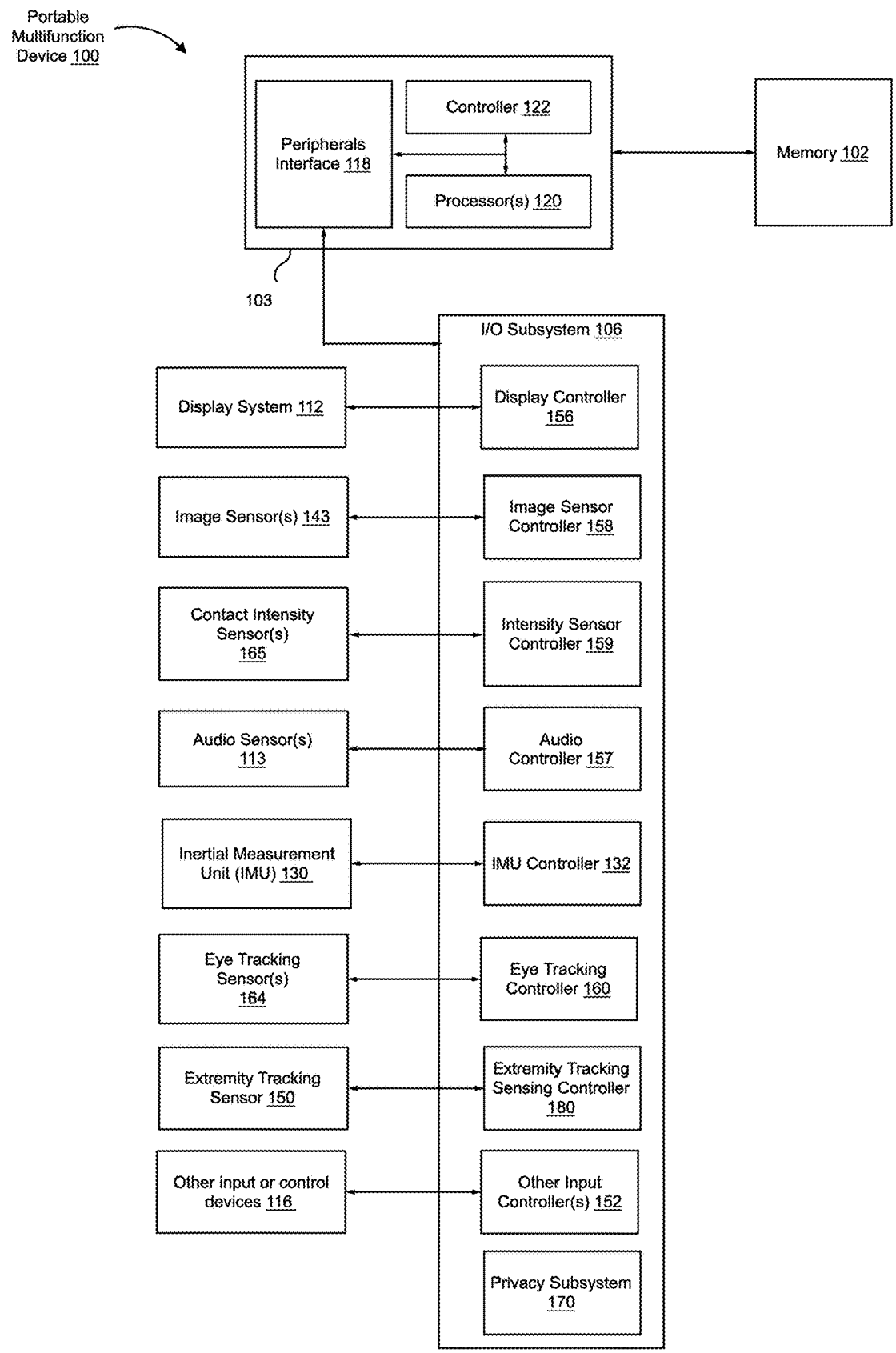
FIG. 1 is a block diagram of an example of a portable multifunction device in accordance with some implementations.

A device may display a 2D content item within a 2D content region of the display, such as displaying a 2D thumbnail within a webpage. In some circumstances, the device generates and displays a volumetric representation of the 2D content item. For example, while displaying a 2D content item within the 2D content region, the device receives an input requesting display of a volumetric (e.g., three-dimensional (3D)) representation of the 2D content item. Based on the input, the device generates and displays a volumetric representation of the 2D content item. Generating a volumetric representation of the 2D content item includes a rendering process, which is computationally expensive and time consuming. Accordingly, a relatively large delay is associated with the transition between reception of the input, generation of a volumetric representation, and display of the volumetric representation. The relatively large delay often results in the display of undesirable visual artifacts, thereby degrading the user experience.

By contrast, various implementations disclosed herein include methods, systems, and electronic devices for rendering a volumetric object before performing a display mode transition associated with display of the volumetric object, thereby providing a more seamless transition between display modes. To that end, an electronic device renders the volumetric object in order to generate object data. The object data indicates a volumetric representation of the volumetric object. Moreover, the electronic device displays the object data according to a first display mode, including displaying the first object data within a 2D content region. For example, the electronic device displays a rendered 3D model of a couch within a webpage. Subsequently, the electronic device detects a request to change from the first display mode to a second display mode. Based on the request, the electronic device displays the first object data according to the second display mode, including displaying the first object data (e.g., the rendered 3D model of the couch) within a representation of a physical environment. The representation of the physical environment provides a 3D representation of the physical environment. Generating the object data before detecting the request enables a faster and more seamless (e.g., fewer visual artifacts) display mode transition, as compared with other devices.

DESCRIPTION

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described implementations. The first contact and the second contact are both contacts, but they are not the same contact, unless the context clearly indicates otherwise.

The terminology used in the description of the various described implementations herein is for the purpose of describing particular implementations only and is not intended to be limiting. As used in the description of the various described implementations and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting", depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]", depending on the context.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 1 is a block diagram of an example of a portable multifunction device 100 (sometimes also referred to herein as the "electronic device 100" for the sake of brevity) in accordance with some implementations. The electronic device 100 includes memory 102 (e.g., one or more non-transitory computer readable storage mediums), a memory controller 122, one or more processing units (CPUs) 120, a peripherals interface 118, an input/output (I/O) subsystem 106, a display system 112, an inertial measurement unit (IMU) 130, image sensor(s) 143 (e.g., camera), contact intensity sensor(s) 165, audio sensor(s) 113 (e.g., microphone), eye tracking sensor(s) 164 (e.g., included within a head-mountable device (HMD)), an extremity tracking sensor 150, and other input or control device(s) 116. In some implementations, the electronic device 100 corresponds to one of a mobile phone, tablet, laptop, wearable computing device, head-mountable device (HMD), head-mountable enclosure (e.g., the electronic device 100 slides into or otherwise attaches to a head-mountable enclosure), or the like. In some implementations, the head-mountable enclosure is shaped to form a receptacle for receiving the electronic device 100 with a display.

In some implementations, the peripherals interface 118, the one or more processing units 120, and the memory controller 122 are, optionally, implemented on a single chip, such as a chip 103. In some other implementations, they are, optionally, implemented on separate chips.

The I/O subsystem 106 couples input/output peripherals on the electronic device 100, such as the display system 112 and the other input or control devices 116, with the peripherals interface 118. The I/O subsystem 106 optionally includes a display controller 156, an image sensor controller 158, an intensity sensor controller 159, an audio controller 157, an eye tracking controller 160, one or more input controllers 152 for other input or control devices, an IMU controller 132, an extremity tracking controller 180, and a privacy subsystem 170. The one or more input controllers 152 receive/send electrical signals from/to the other input or control devices 116. The other input or control devices 116 optionally include physical buttons (e.g., push buttons, rocker buttons, etc.), dials, slider switches, joysticks, click wheels, and so forth. In some alternate implementations, the one or more input controllers 152 are, optionally, coupled with any (or none) of the following: a keyboard, infrared port, Universal Serial Bus (USB) port, stylus, finger-wearable device, and/or a pointer device such as a mouse. The one or more buttons optionally include a push button. In some implementations, the other input or control devices 116 includes a positional system (e.g., GPS) that obtains information concerning the location and/or orientation of the electronic device 100 relative to a particular object. In some implementations, the other input or control devices 116 include a depth sensor and/or a time-of-flight sensor that obtains depth information characterizing a physical object within a physical environment. In some implementations, the other input or control devices 116 include an ambient light sensor that senses ambient light from a physical environment and outputs corresponding ambient light data.

The display system 112 provides an input interface and an output interface between the electronic device 100 and a user. The display controller 156 receives and/or sends electrical signals from/to the display system 112. The display system 112 displays visual output to the user. The visual output optionally includes graphics, text, icons, video, and any combination thereof (sometimes referred to herein as "computer-generated content"). In some implementations, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

The display system 112 may have a touch-sensitive surface, sensor, or set of sensors that accepts input from the user based on haptic and/or tactile contact. The display system 112 and the display controller 156 (along with any associated modules and/or sets of instructions in the memory 102) detect contact (and any movement or breaking of the contact) on the display system 112 and converts the detected contact into interaction with user-interface objects (e.g., one or more soft keys, icons, web pages or images) that are displayed on the display system 112. In an example implementation, a point of contact between the display system 112 and the user corresponds to a finger of the user or a finger-wearable device.

The display system 112 optionally uses LCD (liquid crystal display) technology, LPD (light emitting polymer display) technology, or LED (light emitting diode) technology, although other display technologies are used in other implementations. The display system 112 and the display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with the display system 112.

The user optionally makes contact with the display system 112 using any suitable object or appendage, such as a stylus, a finger-wearable device, a finger, and so forth. In some implementations, the user interface is designed to work with finger-based contacts and gestures, which can be less precise than stylus-based input due to the larger area of contact of a finger on the touch screen. In some implementations, the electronic device 100 translates the rough finger-based input into a precise pointer/cursor position or command for performing the actions desired by the user.

Audio circuitry also receives electrical signals converted by the audio sensors 113 (e.g., a microphone) from sound waves. Audio circuitry converts the electrical signal to audio data and transmits the audio data to the peripherals interface 118 for processing. Audio data is, optionally, retrieved from and/or transmitted to the memory 102 and/or RF circuitry by the peripherals interface 118. In some implementations, audio circuitry also includes a headset jack. The headset jack provides an interface between audio circuitry and removable audio input/output peripherals, such as output-only headphones or a headset with both output (e.g., a headphone for one or both ears) and input (e.g., a microphone).

The inertial measurement unit (IMU) 130 includes accelerometers, gyroscopes, and/or magnetometers in order measure various forces, angular rates, and/or magnetic field information with respect to the electronic device 100. Accordingly, according to various implementations, the IMU 130 detects one or more positional change inputs of the electronic device 100, such as the electronic device 100 being shaken, rotated, moved in a particular direction, and/or the like.

The image sensor(s) 143 capture still images and/or video. In some implementations, an image sensor 143 is located on the back of the electronic device 100, opposite a touch screen on the front of the electronic device 100, so that the touch screen is enabled for use as a viewfinder for still and/or video image acquisition. In some implementations, another image sensor 143 is located on the front of the electronic device 100 so that the user's image is obtained (e.g., for selfies, for videoconferencing while the user views the other video conference participants on the touch screen, etc.). In some implementations, the image sensor(s) are integrated within an HMD. For example, the image sensor(s)

143 output image data that represents a physical object (e.g., a physical agent) within a physical environment.

The contact intensity sensors 165 detect intensity of contacts on the electronic device 100 (e.g., a touch input on a touch-sensitive surface of the electronic device 100). The contact intensity sensors 165 are coupled with the intensity sensor controller 159 in the I/O subsystem 106. The contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). The contact intensity sensor(s) 165 receive contact intensity information (e.g., pressure information or a proxy for pressure information) from the physical environment. In some implementations, at least one contact intensity sensor 165 is collocated with, or proximate to, a touch-sensitive surface of the electronic device 100. In some implementations, at least one contact intensity sensor 165 is located on the side of the electronic device 100.

The eye tracking sensor(s) 164 detect an eye gaze of a user of the electronic device 100 and generate eye tracking data indicative of a gaze position of the user. In various implementations, the eye tracking data includes data indicative of a fixation point (e.g., point of regard) of the user on a display panel, such as a display panel within a head-mountable device (HMD), a head-mountable enclosure, or within a heads-up display.

The extremity tracking sensor 150 obtains extremity tracking data indicative of a position of an extremity of a user. For example, in some implementations, the extremity tracking sensor 150 corresponds to a hand tracking sensor that obtains hand tracking data indicative of a position of a hand or a finger of a user within a particular object. In some implementations, the extremity tracking sensor 150 utilizes computer vision techniques to estimate the pose of the extremity based on camera images.

In various implementations, the electronic device 100 includes a privacy subsystem 170 that includes one or more privacy setting filters associated with user information, such as user information included in extremity tracking data, eye gaze data, and/or body position data associated with a user. In some implementations, the privacy subsystem 170 selectively prevents and/or limits the electronic device 100 or portions thereof from obtaining and/or transmitting the user information. To this end, the privacy subsystem 170 receives user preferences and/or selections from the user in response to prompting the user for the same. In some implementations, the privacy subsystem 170 prevents the electronic device 100 from obtaining and/or transmitting the user information unless and until the privacy subsystem 170 obtains informed consent from the user. In some implementations, the privacy subsystem 170 anonymizes (e.g., scrambles or obscures) certain types of user information. For example, the privacy subsystem 170 receives user inputs designating which types of user information the privacy subsystem 170 anonymizes. As another example, the privacy subsystem 170 anonymizes certain types of user information likely to include sensitive and/or identifying information, independent of user designation (e.g., automatically).

Figure 2A:
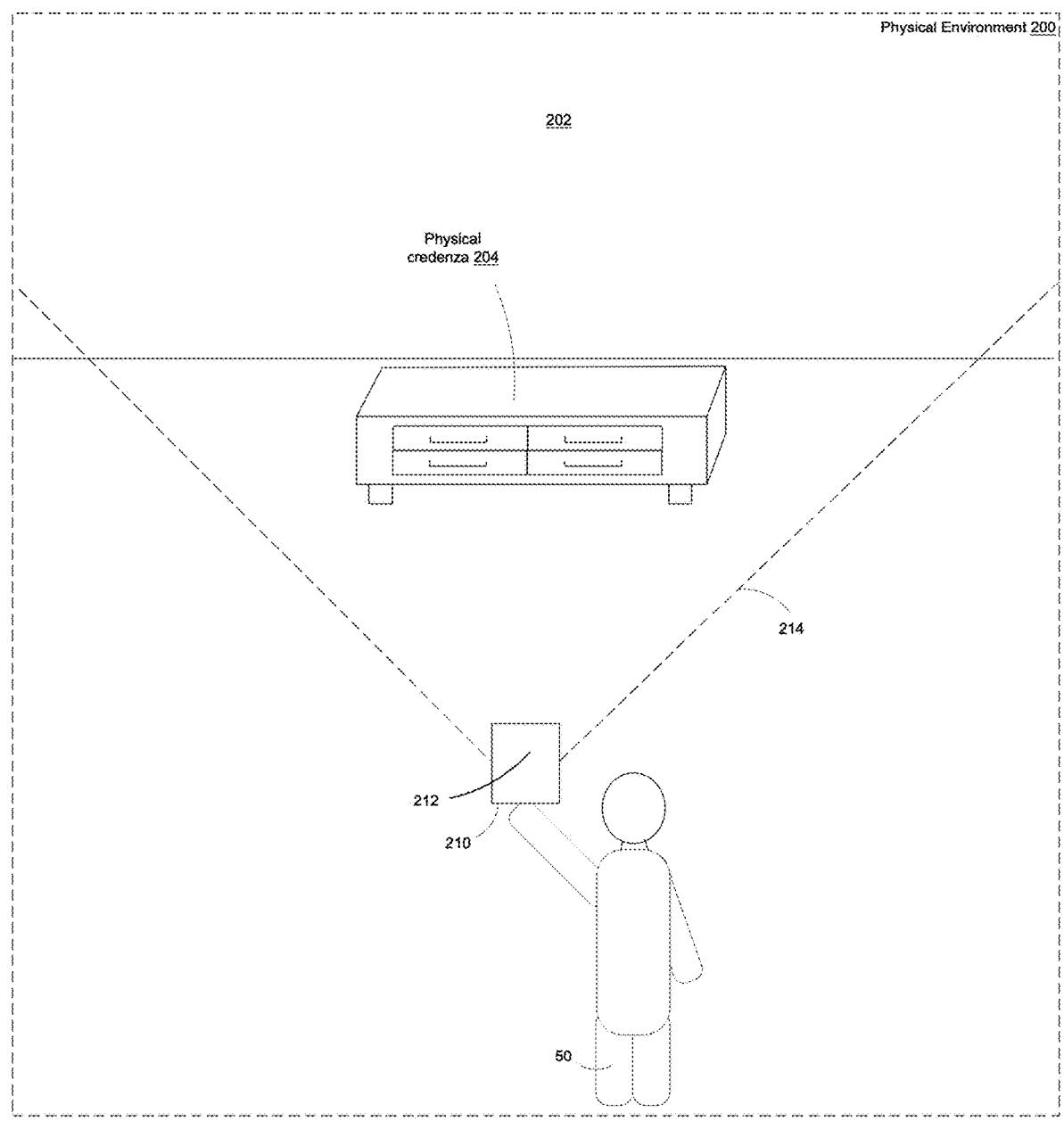
FIGS. 2A-2J are examples of rendering volumetric objects before performing respective display mode transitions in accordance with some implementations.

FIGS. 2A-2J are examples of rendering volumetric objects before performing respective display mode transitions in accordance with some implementations. As illustrated in FIG. 2A, a physical environment 200 includes a physical wall 202, a physical credenza 204, and a user 50 holding an electronic device 210. The electronic device 210 includes a display 212 that is associated with a viewable region 214 of the physical environment 200. The viewable region 214 includes a portion of the physical wall 202 and the physical credenza 204. In some implementations, the electronic device 210 corresponds to a mobile device, such as a smartphone, tablet, wearable device, and/or the like. In some implementations, the electronic device 210 corresponds to a head-mountable device (HMD) that can include one or more opaque or see-through displays.

In some implementations, the electronic device 210 includes an image sensor, such as a scene camera. The image sensor may capture image data characterizing the physical environment 200. The image data may correspond to an image or a sequence of images (e.g., a video stream). As is described with reference to FIG. 3, the electronic device 210 may include a compositing system that composites the image data with object data, wherein the object data corresponds to a rendered volumetric (e.g., 3D) object.

Figure 2B:
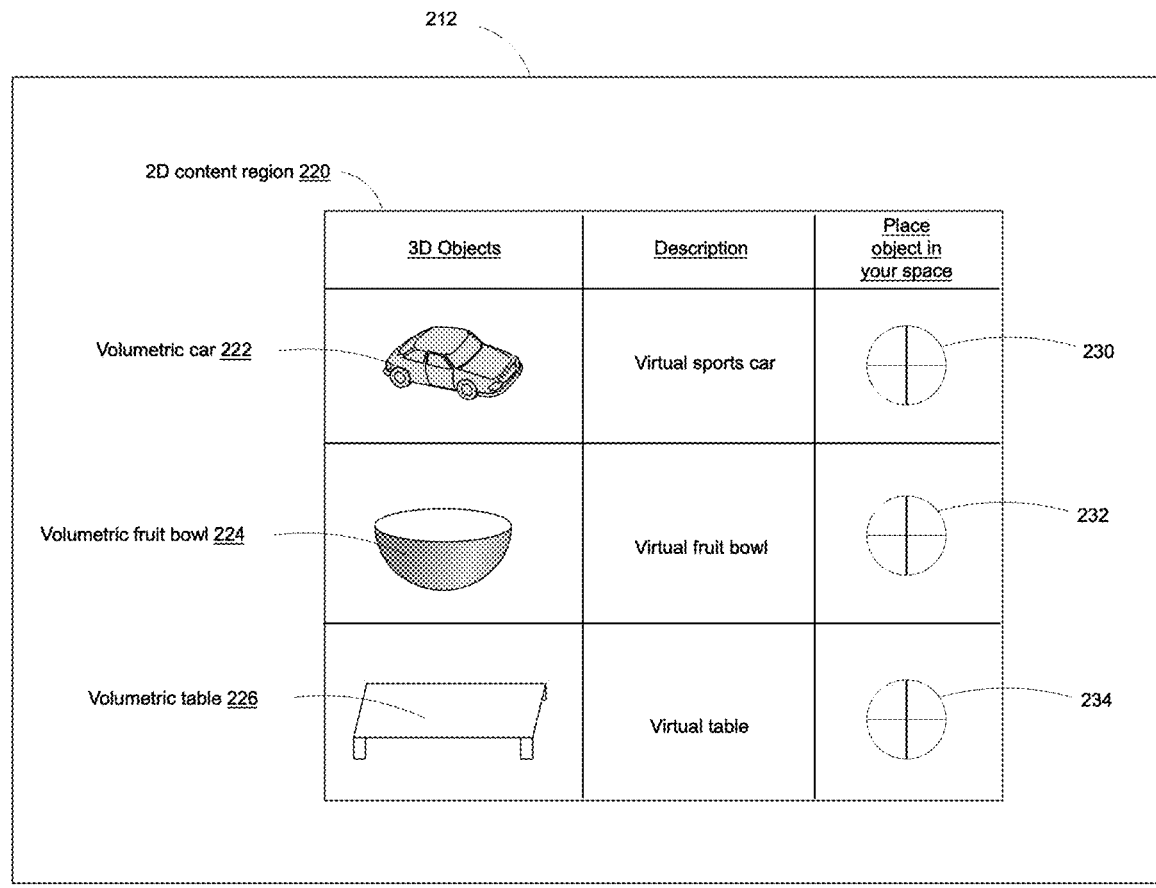

As illustrated in FIG. 2B, the electronic device 210 displays, on the display 212, various object data within a 2D content region 220 according to a first display mode. The various object data includes first object data corresponding to a volumetric car 222, second object data corresponding to a volumetric fruit bowl 224, and third object data corresponding to a volumetric table 226. To that end, the electronic device 210 renders a first volumetric object in order to generate the first object data, renders a second volumetric object in order to generate the second object data, and renders a third volumetric object in order to generate the third object data. For example, the electronic device 210 includes a graphics processing unit (GPU) that performs the rendering. A particular volumetric object may be defined in a scene file, which describes geometry, viewpoint, texture, lighting, and shading information characterizing the particular volumetric object.

The 2D content region 220 may correspond to an application window, such as a webpage or a canvas of a drawing application. In some implementations, in addition to including the volumetric car 222, the volumetric fruit bowl 224, and the volumetric table 226 ("the 3D Objects"), the 2D content region 220 includes 2D content. For example, as illustrated in FIG. 2B, the 2D content region 220 includes column header text ("3D Objects;" "Description;" and "Place object in your space"), as well as text describing the volumetric objects ("Virtual sports car;" "Virtual fruit bowl; and "Virtual table"). As another example, as illustrated in FIG. 2B, the 2D content region 220 includes a first affordance 230 associated with the volumetric car 222, a second affordance 232 associated with the volumetric fruit bowl 224, and a third affordance 234 associated with the volumetric table 226. Details regarding the affordances are provided below.

In some implementations, while displaying the various object data according to the first display mode, the electronic device 210 does not display a representation of the physical environment 200. Accordingly, in some implementations, while displaying the various object data according to the first display mode, the electronic device 210 does not activate an image sensor of the electronic device 210, and thus the image sensor is not capturing image data characterizing the physical environment 200.

Figure 2C:
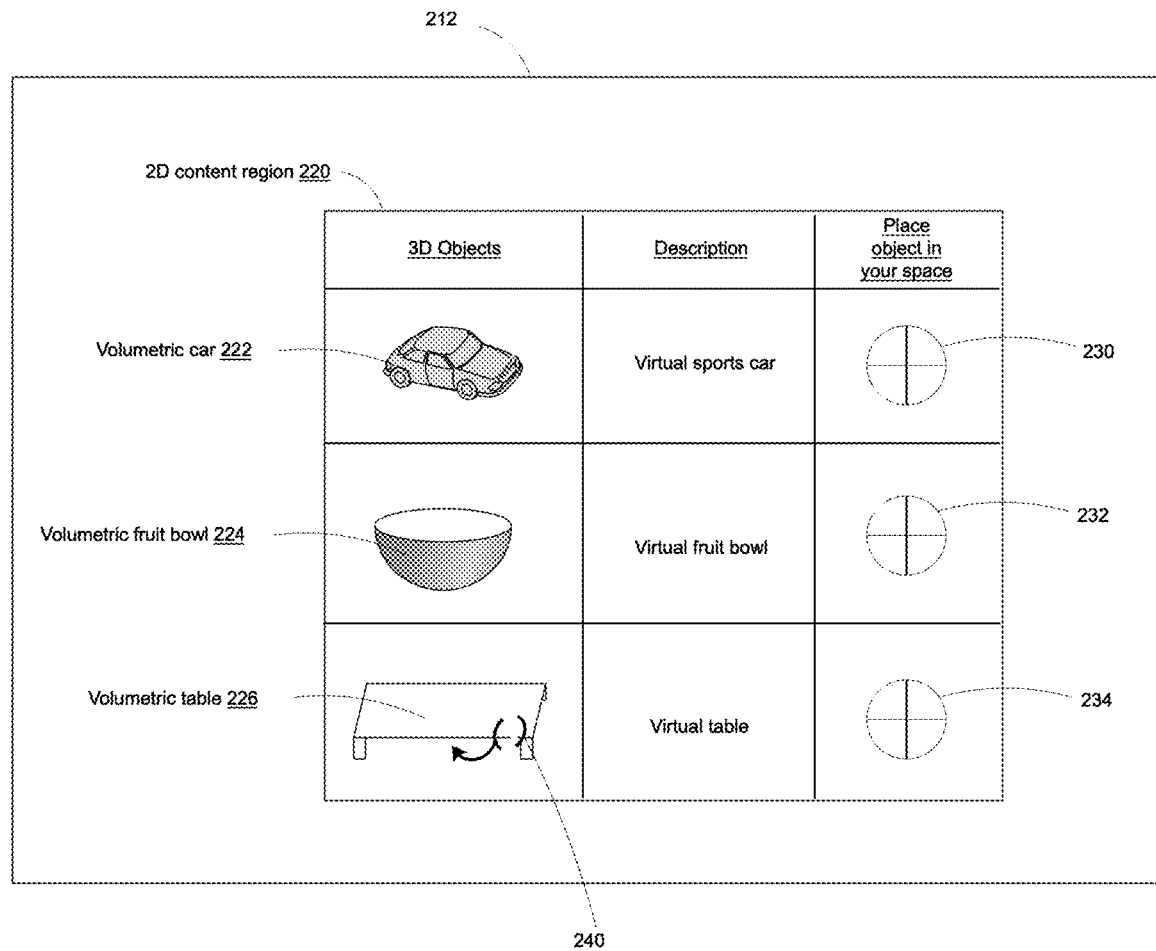
Figure 2D:
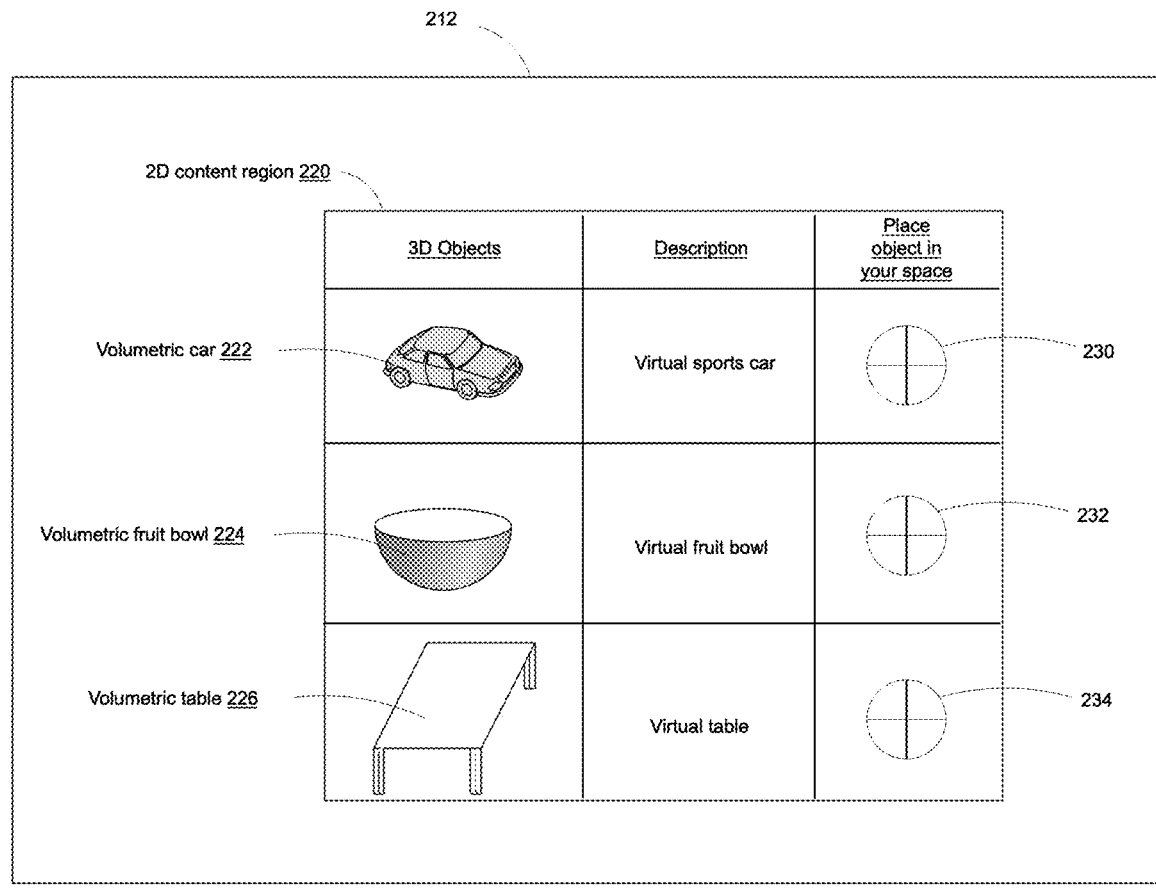

As illustrated in FIG. 2C, the electronic device 210 receives, via one or more input devices, a first manipulation input 240 that is directed to the volumetric table 226. Namely, the first manipulation input 240 corresponds to a 90 degree clockwise rotation of the volumetric table 226. For example, the one or more input devices includes an extremity tracker that tracks a clockwise rotation of a hand of the user 50. Based on the first manipulation input 240, the electronic device 210 updates rendering of the third volumetric object in order to generate updated third object data. As illustrated in FIG. 2D, the electronic device 210 displays, on the display 212, the updated third object data corresponding to a 90 degree clockwise rotated volumetric table 226, as compared with the volumetric table 226 illustrated in FIG. 2C.

Figure 2E:
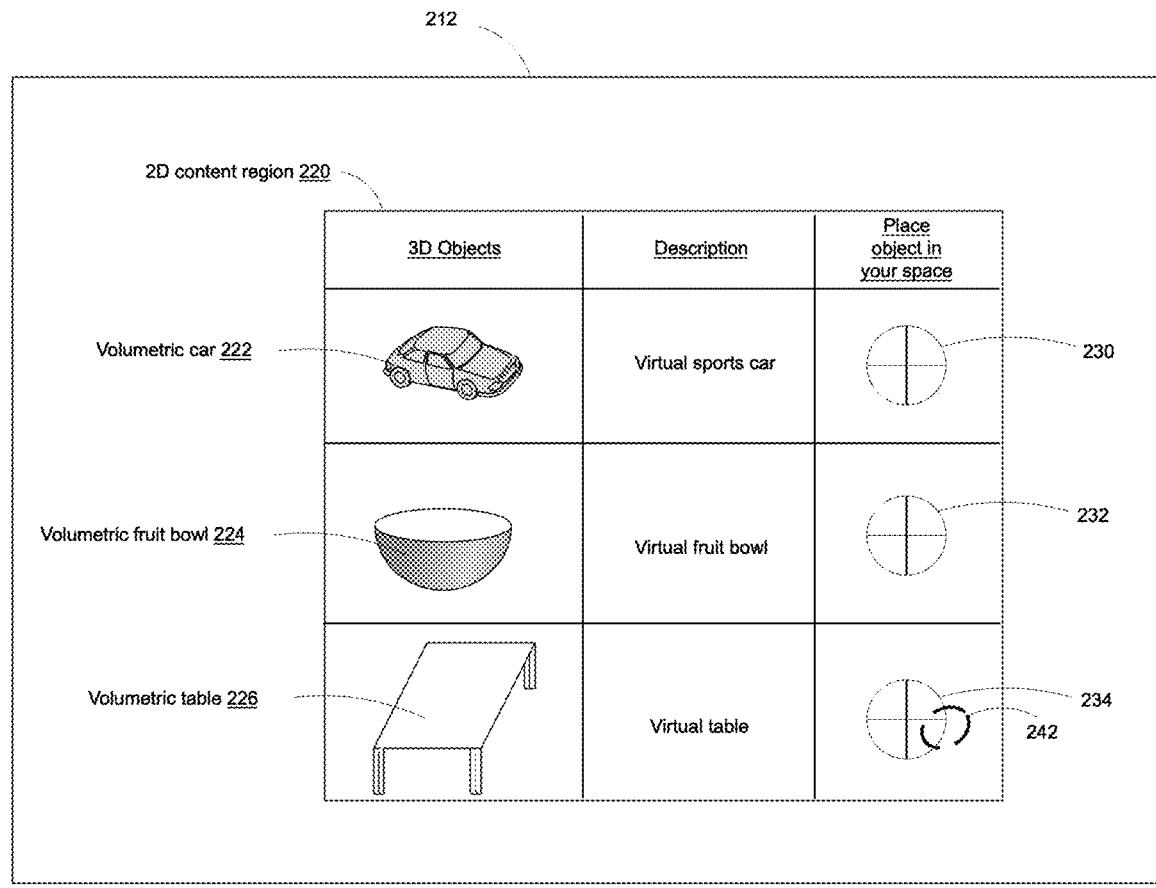

As illustrated in FIG. 2E, the electronic device 210 receives a first request 242 that is directed to the third affordance 234. The first request 242 requests the electronic device 210 to change from the first display mode to a second display mode. Moreover, the first request 242 requests the electronic device 210 to display the updated third object data according to the second display mode. For example, the electronic device 210 tracks a finger of the user 50 that is spatially directed to the third affordance 234. As another example, the electronic device 210 tracks an eye gaze of the user 50 that is spatially directed to the third affordance 234. In some implementations, the second display mode includes a representation of the physical environment 220. For example, the second display mode is characterized by an augmented reality (AR) environment or a mixed reality (MR) environment. One of ordinary skill in the art will appreciate that a request to change display modes may correspond to various input types, such as a hardware input (e.g., button press), a voice input from the user 50 (e.g., "show me the virtual table placed in my room"), or extremity/gaze selection of a particular volumetric object (rather than selection of a corresponding affordance).

Figure 2F:
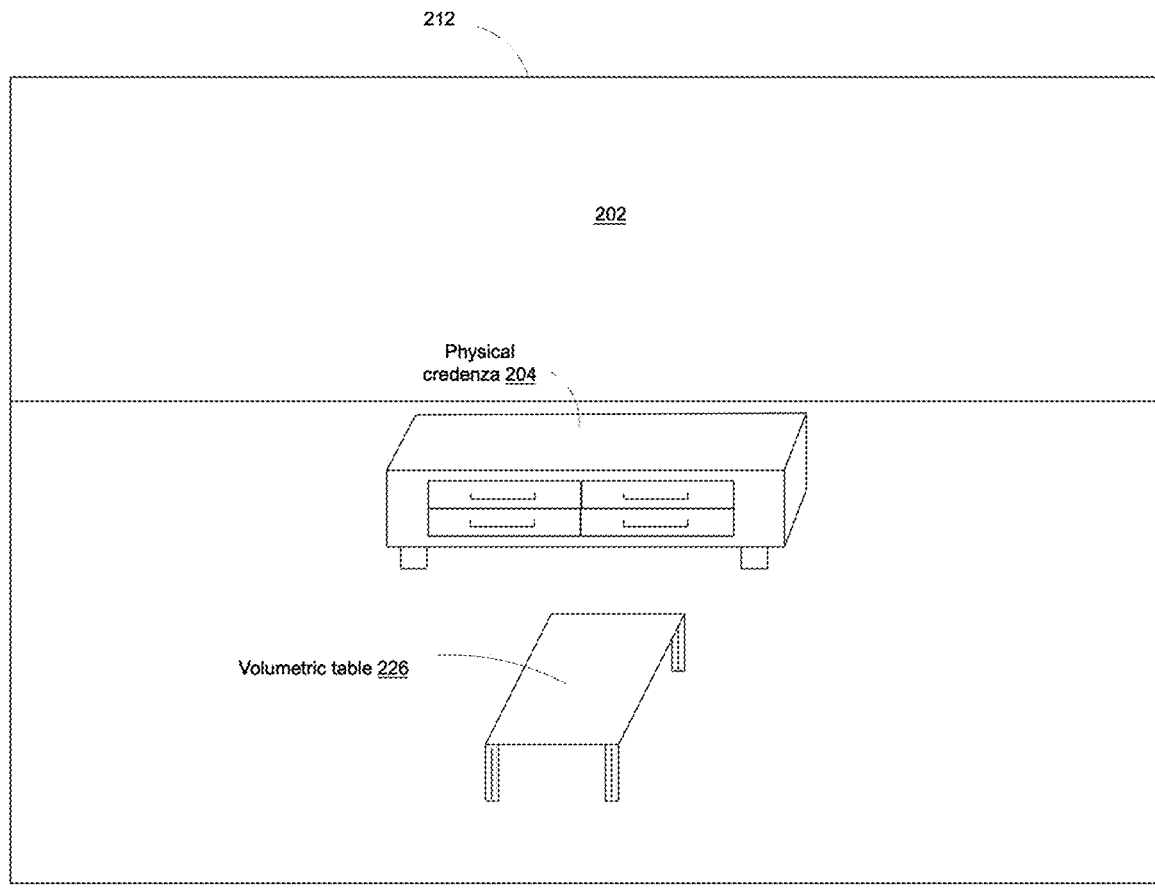

As illustrated in FIG. 2F, in response to receiving the first request 242, the electronic device 210 displays, on the display 212, the updated third object data according to the second display mode. Notably, the second display mode includes the updated third object data displayed within a representation of the physical environment 200. For example, the representation of the physical environment 200 approximately corresponds to the viewable region 216 associated with the display 212. Accordingly, the representation of the physical environment 200 includes a representation of the physical credenza 204 and a representation of the portion of the physical wall 202. To that end, in some implementations, in response to receiving the first request 242, the electronic device 210 activates an image sensor that captures image data characterizing the physical environment 200. The image data, thus, corresponds to the representation of the physical environment 200. Moreover, the electronic device 210 composites the image data with the updated third object data in order to generate display data, and sends the composited result the display 212 for display.

Rendering a volumetric object before receiving a request—e.g., the first request 242—enables the electronic device 210 to provide a more seamless transition between display modes, as compared with other devices. For example, the volumetric object can be pre-rendered as 3D content and displayed in-line with 2D content, such as a 2D web page or a 2D canvas. Based on receiving the first request 242, the electronic device 210 can transition from a first display mode to a second display mode without having to re-render the volumetric object, thereby providing a seamless transition. For example, the electronic device 210 persistently displays a volumetric object across a transition between display modes such that the volumetric object does not disappear and re-appear during the transition. As mentioned above, in some implementations, the first display mode includes a volumetric object not directly superimposed over image data (e.g., a live camera feed) of a physical environment, whereas the second display mode includes the volumetric object directly superimposed over at least a portion of the image data. In contrast, other devices may display a 2D representation of a table (e.g., a thumbnail of a table) within a content region, and not render a 3D object of a table until receiving a display mode change request. The other devices, therefore, produce a delay between receiving the display mode change request and displaying the rendered 3D table. Moreover, the other devices may display undesirable visual artifacts before completing the rendering.

Figure 2G:
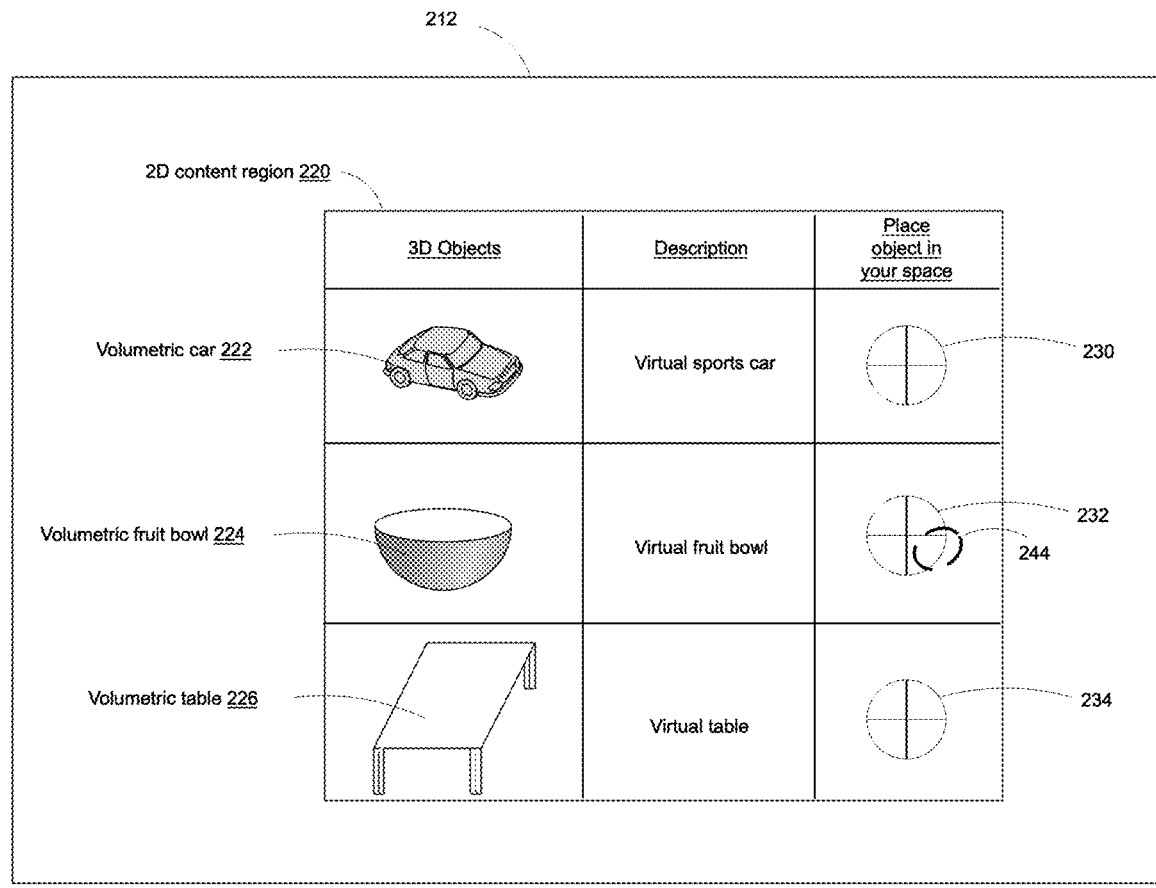
Figure 2H:
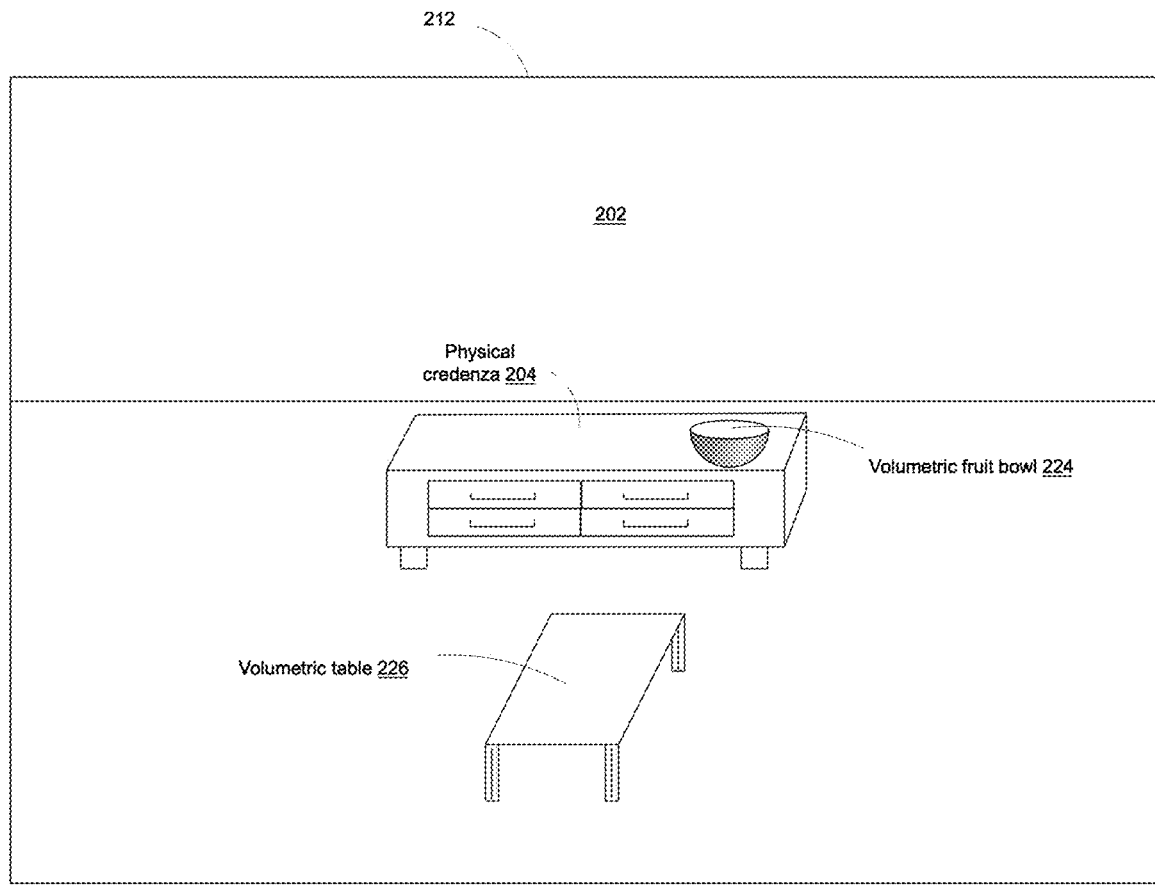

As illustrated in FIG. 2G, while in the first display mode, the electronic device 210 receives a second request 244 that is directed to the second affordance 232 within the 2D content region 220. The second request 244 requests the electronic device 210 to change from the first display mode to the second display mode. Moreover, the second request 244 requests the electronic device 210 to display the second object data according to the second display mode. In response to receiving the second request 244 in FIG. 2G, the electronic device 210 displays, on the display 212, the second object data overlaid on the physical credenza 204, as illustrated in FIG. 2H. The second object data corresponds to the volumetric fruit bowl 224. To that end, in some implementations, the electronic device 210 performs a computer vision technique with respect to the image data in order to identify the physical credenza 204 within the image data, and overlay the second object data onto a portion of the image data that represents the physical credenza 204.

Figure 2I:
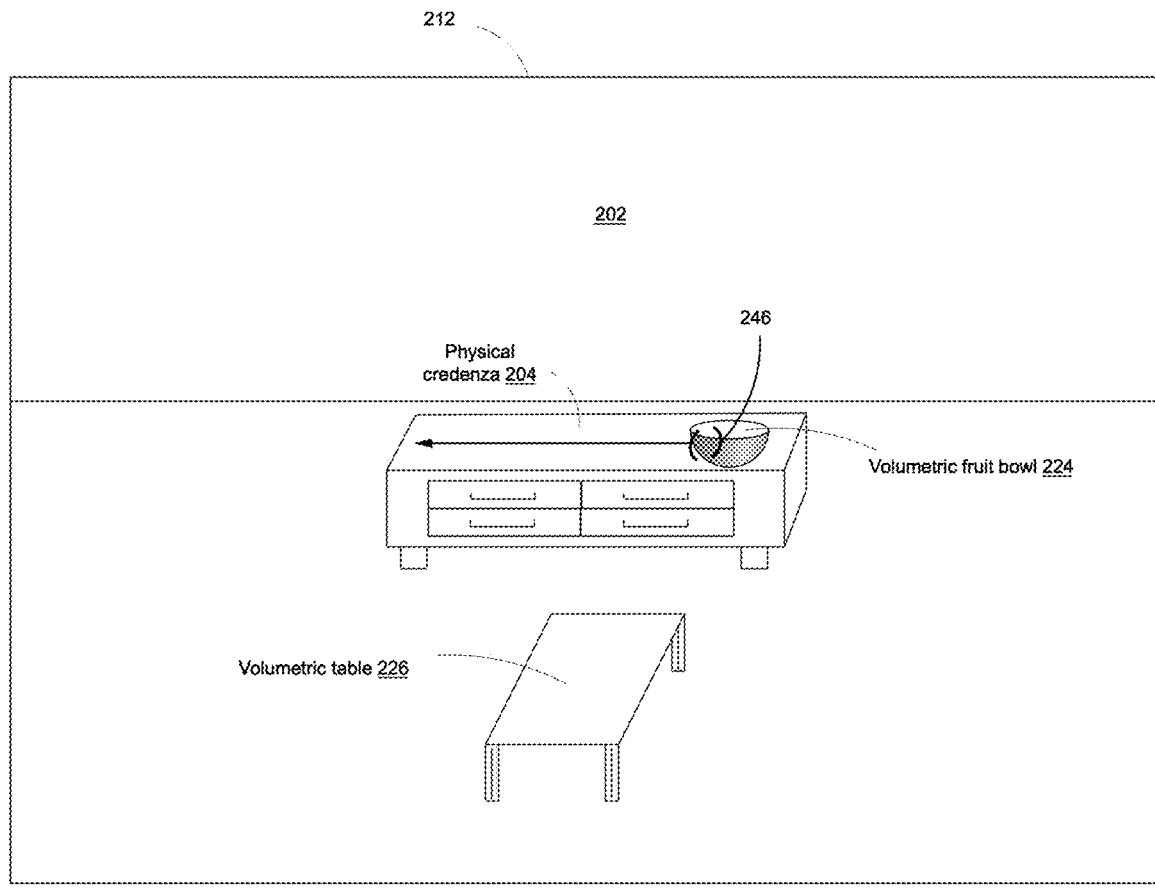
Figure 2J:
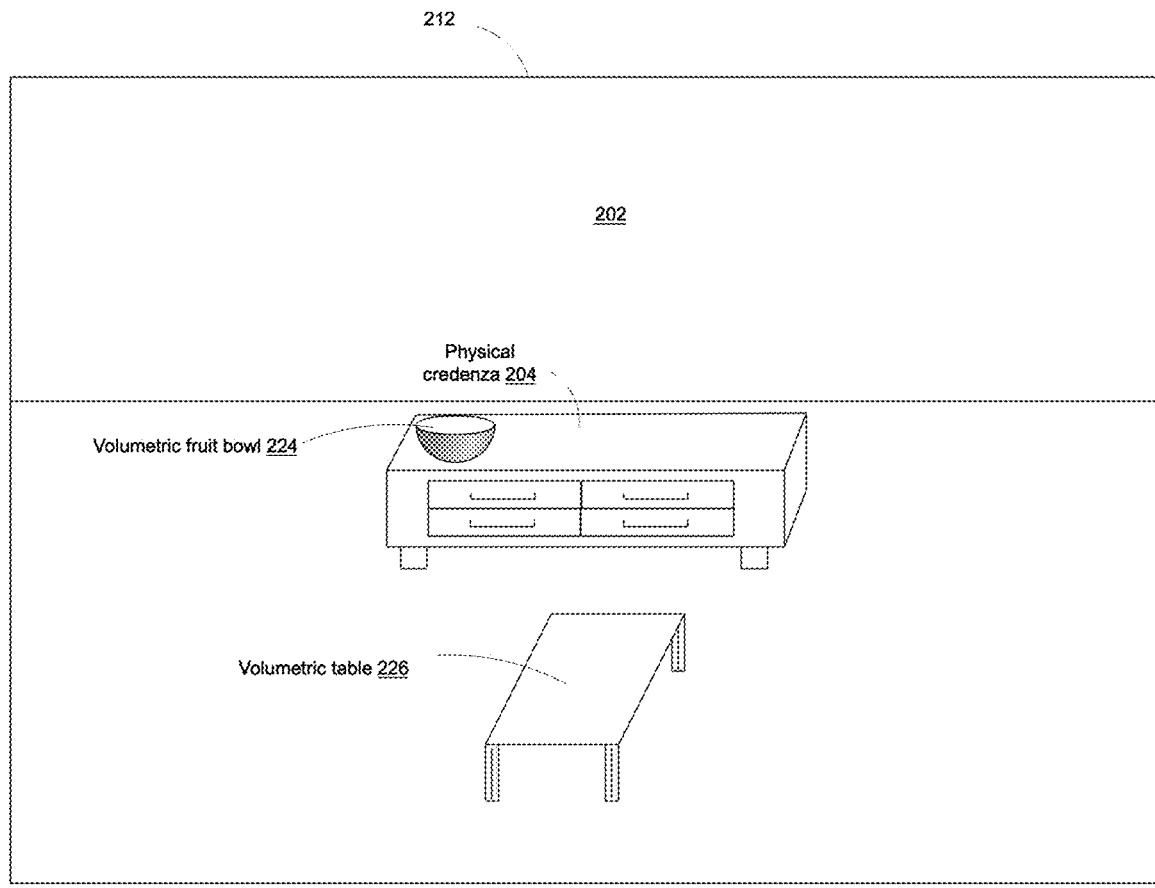

As illustrated in FIG. 2I, the electronic device 210 receives, via one or more input devices, a second manipulation input 246 that is directed to the volumetric fruit bowl 224. The second manipulation input 246 corresponds to a request to move the volumetric fruit bowl 224 leftwards along the surface of the physical credenza 204. For example, the second manipulation input 246 is a leftwards movement of a hand of the user 50, which originates at a position corresponding to the volumetric fruit bowl 224. The electronic device 210 may include an extremity tracker in order to track the movement of the hand of the user 50. Based on the second manipulation input 246, the electronic device 210 updates the rendering of the second volumetric object in order to generate updated second object data. The updated second object data is displayed on the display 212, as illustrated in FIG. 2J.

Figure 3:
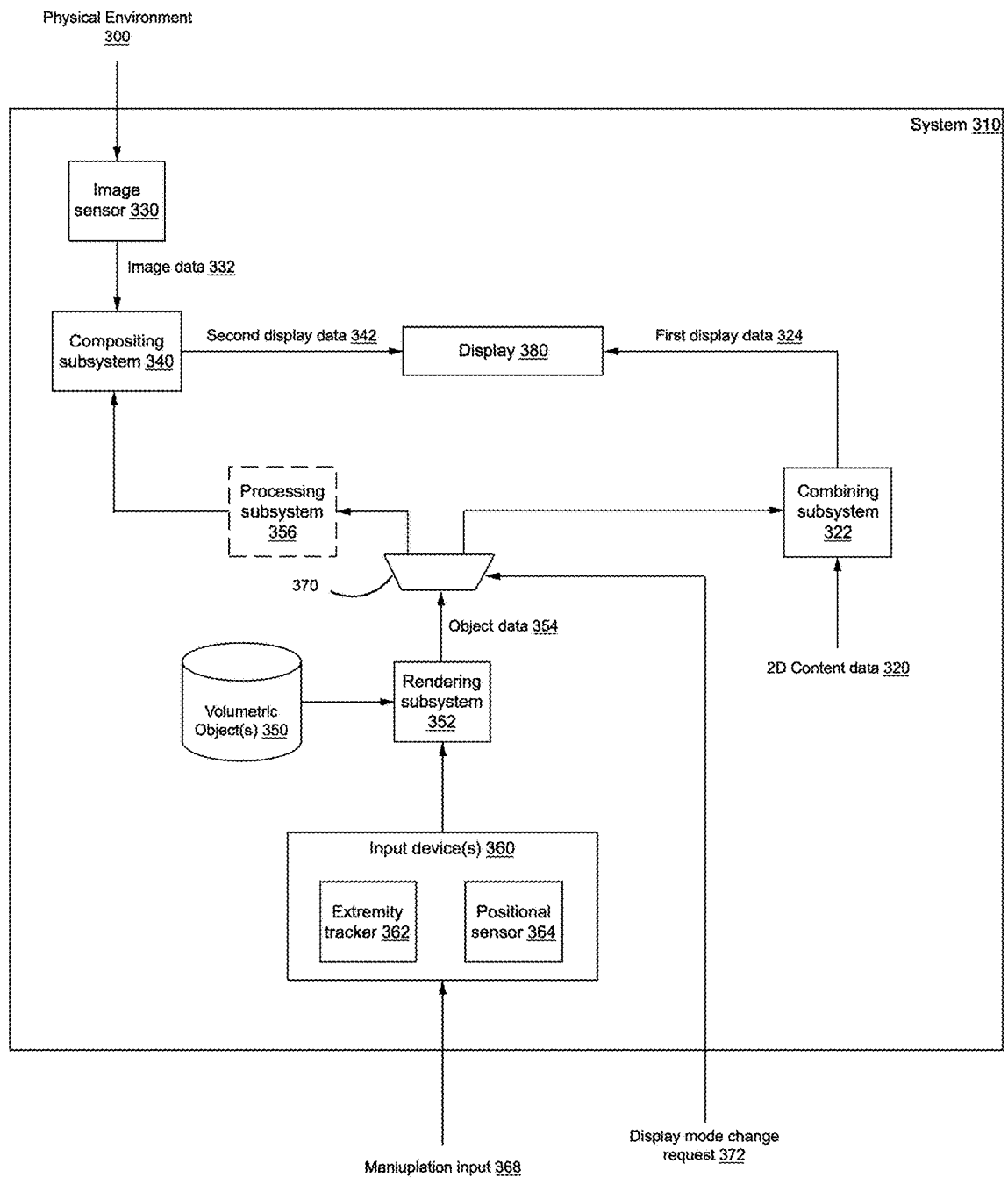
FIG. 3 is an example of a block diagram of a system for displaying rendered volumetric objects according to different display modes in accordance with some implementations.

FIG. 3 is an example of a block diagram of a system 310 for displaying rendered volumetric objects according to different display modes in accordance with some implementations. In various implementations, the system 310 or portions thereof are integrated in an electronic device, such as the electronic device 210 described with reference to FIGS. 2A-2J.

The system 310 includes a rendering subsystem 352 that renders one or more volumetric objects in order to generate object data 354. Each portion of the object data 354 provides a volumetric (e.g., 3D) representation of a corresponding one of the volumetric object(s). For example, with reference to FIG. 2B, a first portion of the object data 354 corresponds to the volumetric car 222, and a second portion of the object data 354 corresponds to the volumetric fruit bowl 224. In some implementations, the rendering subsystem 352 obtains the volumetric object(s) from a volumetric object(s) datastore 350, such as a buffer or other non-transitory memory. In some implementations, the rendering subsystem 352 includes a GPU that performs the rendering. According to various implementations, the system 310 includes one or more input devices 360 that detect a manipulation input 368, and the rendering subsystem 352 updates the rendering based on the manipulation input 368.

For example, the input device(s) 360 include an extremity tracker 362 that receives the manipulation input 368. Based on the manipulation input 368, the extremity tracker 362 may detect that an extremity of a user is directed to a particular displayed volumetric object, such as when a hand of the user is less than a threshold distance from the particular displayed volumetric object. Accordingly, the system 310 selects the particular displayed volumetric object. Moreover, the extremity tracker 362 may detect a movement of the extremity, and the rendering subsystem 352 accordingly updates rendering of the particular displayed volumetric object. As one example, as illustrated in FIG. 2I, the extremity tracker 362 receives the second manipulation input 246 that selects the volumetric fruit bowl 224, and the rendering subsystem 352 accordingly updates the rendering in order to move the volumetric fruit bowl 224 leftwards across the physical credenza 204 on the display 212.

As another example, the input device(s) 360 include a positional sensor 364, such as an IMU, a touch sensor (e.g., included on a touch-sensitive surface), a magnetic sensor, and/or the like. The positional sensor 364 receives the manipulation input 368, and detects a positional change of the system 310 based on the manipulation input 368. For example, with reference to FIG. 2F, based on a leftwards rotation of the electronic device 210, the rendering subsystem 352 updates rendering of the volumetric table 226 such that the volumetric table 226 appears to correspondingly move rightwards across the display 212.

In some implementations, the system 310 includes a demultiplexer 370. The demultiplexer 370 switches between a first state and a second state, based on a display mode change request 372. The first state is associated with a first display mode, whereas the second state is associated with a second display mode. While in the first state, the demultiplexer 370 outputs the object data 354 to a combining subsystem 322, which generates first display data 324 associated with the first display mode. While in the second state, the demultiplexer 370 outputs the object data 354 to a compositing subsystem 340 (or optionally first to a processing subsystem 356), which generates second display data 342 associated with the second display mode. For example, the display mode change request 372 corresponds to an input spatially directed to a volumetric object displayed within a 2D content region, or an input spatially directed to an affordance that is associated with a volumetric object, such as the first request 242 illustrated in FIG. 2E. As another example, the display mode change request 372 corresponds to a hardware input (e.g., pressing a push-button). As yet another example, the display mode change request 372 corresponds to a predetermined positional change of the system 310, such as shake of the system 310 as detected by the positional sensor 364.

According to various implementations, the system 310 displays, on a display 380, the object data 354 according to the first display mode. The first display mode includes displaying the first object data 354 within a 2D content region. For example, the 2D content region includes the outer boundary of an application window, such as webpage window or a drawing application window. The 2D content region is indicated within 2D content data 320. The 2D content data 320 may also indicate 2D content. For example, based on a request for a particular webpage, the system 310 obtains, from a web server, the 2D content data 320 that indicates the particular webpage. The 2D content data 320 may also indicate 2D content, such as text or thumbnails within the particular webpage. As another example, the system 310 obtains the 2D content data 320 from local storage, such as from a buffer being utilized by an active drawing application. In order to display the object data 354 according to the first display mode, the system 310 includes the combining subsystem 322. The combining subsystem 322 combines the 2D content data 320 with the object data 354 in order to generate first display data 324. For example, with reference to FIG. 2B, the first display data 324 indicates the volumetric car 222 within the 2D content region 220.

In contrast to the first display mode, the second display mode includes displaying, on the display 380, the object data 354 within a representation of a physical environment 300. To that end, in some implementations, the system 310 includes an image sensor 330 that captures image data 322 characterizing the physical environment 300. The image data 332 indicates the representation of the physical environment 300. Further to that end, the system 310 includes the compositing subsystem 340 that composites the image data 332 with the object data 354 in order to generate second display data 342. The second display data 342 indicates one or more volumetric objects within the representation of the physical environment 300. For example, with reference to FIG. 2H, the second display data 342 indicates the volumetric table 226 and the volumetric fruit bowl 224 within the representation of the physical environment 200, which includes a representation of the physical credenza 204.

In some implementations, before compositing the object data 354, the system 310 processes at least a portion of the object data 354. To that end, the system 310 includes the processing subsystem 356. For example, the processing subsystem 356 processes the object data 354 in order to change an appearance of a corresponding rendered volumetric object, such as resizing, repositioning, or changing the color of the rendered volumetric object. For example, the system 310 resizes a rendered volumetric object before displaying the rendered volumetric object within the representation of the physical environment. As another example, with reference to FIG. 2G, the electronic device 210 processes the second object data, which corresponds to the volumetric fruit bowl 224. Moreover, the electronic device 210 composites the processed second object data with the representation of the physical environment 200, in order to generate corresponding display data in FIG. 2H. Thus, the volumetric fruit bowl 224 illustrated in FIG. 2H (second display mode) is smaller than the volumetric fruit bowl 224 illustrated in FIG. 2G (first display mode).

Figure 4:
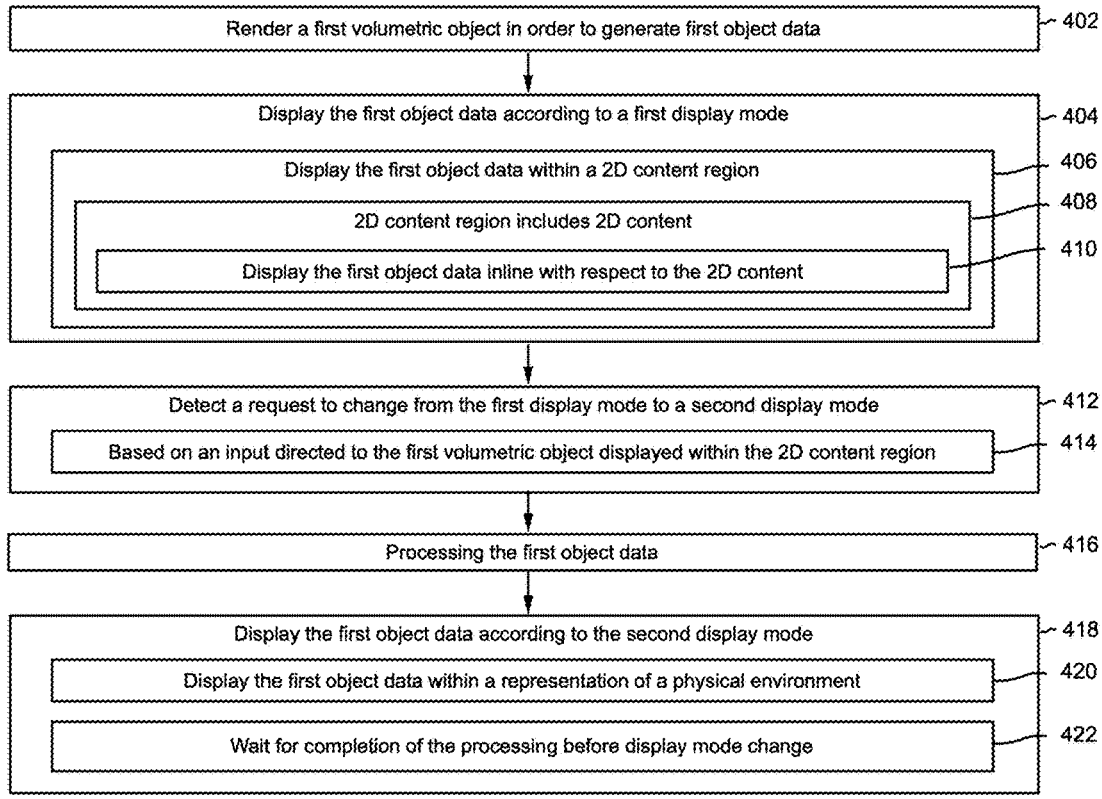
FIG. 4 is an example of a flow diagram of a method of displaying a rendered volumetric object according to different display modes in accordance with some implementations.

FIG. 4 is an example of a flow diagram of a method 400 of displaying a rendered volumetric object according to different display modes in accordance with some implementations. In various implementations, the method 400 or portions thereof are performed by an electronic device (e.g., the electronic device 210). In various implementations, the method 400 or portions thereof are performed by the system 310 illustrated in FIG. 3. In various implementations, the method 400 or portions thereof are performed by a mobile device, such as a smartphone, tablet, or wearable device. In various implementations, the method 400 or portions thereof are performed by a head-mountable device (HMD) including a display. In some implementations, the method 400 is performed by processing logic, including hardware, firmware, software, or a combination thereof. In some implementations, the method 400 is performed by a processor executing code stored in a non-transitory computer-readable medium (e.g., a memory).

As represented by block 402, the method 400 includes rendering a first volumetric object in order to generate first object data. In some implementations, the first object data indicates a plurality of images (e.g., a video stream) representing the first volumetric object at various times. For example, each of the plurality of images represents the first volumetric object from a corresponding one of a plurality of viewing perspectives. As one example, as illustrated in FIG. 2C, the electronic device 210 generates and displays a first image of the volumetric table 226 from a first viewing perspective, whereas the electronic device 210 generates and displays a second image of the volumetric table 226 from a second viewing perspective in FIG. 2D.

As represented by block 404, the method 400 includes displaying the first object data according to a first display mode. As represented by block 406, the first display mode includes displaying the first object data within a 2D content region, such as concurrently displaying the first object data within a 2D webpage application window. To that end, in some implementations, the method 400 includes obtaining 2D content data that indicates the 2D content region, combining the 2D content data with the first object data in order to generate first display data, and sending the first display data to the display. For example, with reference to FIG. 3, the combining subsystem 322 generates the first display data 324 by combining the object data 354 with the 2D content data 320. The first display data indicates the first volumetric object within the 2D content region. For example, as illustrated in FIG. 2G, the electronic device 210 displays, on the display 212, the second object data (corresponding to the volumetric fruit bowl 224) within the 2D content region 220. In some implementations, displaying the first object data according to the first display mode includes displaying a particular image of the first object data.

As represented by block 408, in some implementations, the 2D content data includes 2D content within the 2D content region. For example, with reference to FIG. 2B, the 2D content region 220 includes a 2D table, various 2D text (e.g., "3D objects;" "Virtual sports car"), and 2D affordances 230-234. In some implementations, As represented by block 410, displaying the first object data according to the first display mode includes displaying the first object data in-line with respect to the 2D content. For example, displaying the first object data in-line corresponds to displaying the first object data alongside 2D content within the 2D content region, rather than displaying a textual link to or a 2D representation (e.g., a thumbnail) of a volumetric object. For example, referring to FIG. 2B, the electronic device 210 displays the third object data (corresponding to the volumetric table 226) next to corresponding descriptive text ("Virtual table").

As represented by block 412, the method 400 includes detecting a request to change from the first display mode to a second display mode. For example, the second display mode corresponds to an augmented reality (AR) environment or mixed reality (MR) environment. As represented by block 414, in some implementations, detecting the request includes receiving an input directed to the first volumetric object displayed within the 2D content region. For example, with reference to FIG. 3, the extremity tracker 362 detects an extremity of a user that is directed to the first volumetric object. As another example, a touch sensor detects a touch input from a user that is directed to the first volumetric object. In some implementations, detecting the request is based on the input being directed to the first volumetric object for at least a threshold amount of time. In some implementations, the request corresponds to an input directed to an affordance associated with the first volumetric object. For example, with reference to FIG. 2E, the electronic device 210 receives the first request 242 that is directed to the third affordance 234, which is associated with the volumetric table 226.

As represented by block 416, in some implementations, in response to detecting the request, the method 400 includes processing the first object data. For example, the processing includes changing an appearance of the first object data, such as a resizing operation or repositioning operation. As one example, in response to detecting the first request 242 in FIG. 2E, the electronic device 210 processes the third object data in order to generate a larger version of the volumetric table 226. Accordingly, the volumetric table 226 displayed according to the second display mode (illustrated in FIG. 2F) is larger than the volumetric table 226 displayed according to the first display mode (illustrated in FIG. 2E). In some implementations, the processing is performed by the processing subsystem 356 of FIG. 3.

As represented by block 418, in response to detecting the request, the method 400 includes displaying the first object data according to the second display mode. As represented by block 420, the second display mode includes displaying the first object data within a representation of a physical environment. To that end, in some implementations, the method 400 is performed by an electronic device including an image sensor (e.g., the image sensor 330 of FIG. 3) that captures image data characterizing the physical environment. The image data indicates the representation of the physical environment. Further to that end, in some implementations, the method 400 includes compositing (e.g., via the compositing subsystem 322 in FIG. 3) the image data with the first object data in order to generate second display data. The second display data indicates the first volumetric object within the representation of the physical environment. Further to that end, in some implementations, the method 400 includes sending the second display data to the display. For example, in response to detecting the first request 242 in FIG. 2E, the electronic device 210 activates a camera that captures image data of the physical environment 200. Continuing with this example, the electronic device 210 displays, on the display 212, a representation of the physical environment 200 including a representation of the physical credenza 204, as illustrated in FIG. 2F. In some implementations, the image data includes a sequence of images. In some implementations, the image data corresponds to pass-through image data. In some implementations, displaying the first object data according to the second display mode includes ceasing to display the 2D content region, while maintaining display of the first object data.

The physical environment is associated with an electronic device performing the method 400—e.g., the physical environment includes the electronic device. In some implementations, while displaying the first object data according to the second display mode, the method 400 includes world-locking the rendered first volumetric object to a point or region of the representation of the physical environment. For example, the method 400 includes utilizing simultaneous localization and mapping (SLAM) in order to perform the world-locking. The representation of the physical environment may correspond to a 3D representation of the physical environment, in contrast to the 2D content region.

In some implementations, displaying the first object data according to the second display mode includes displaying the particular image of the first object data. To that end, in some implementations, the method 400 includes storing the particular image in a non-transitory memory in response to detecting the request, and obtaining the particular image from the non-transitory memory in order to display the particular image within the representation of the physical environment. By obtaining the particular image from the non-transitory memory rather than re-rendering the first volumetric object, an electronic device provides a faster and more seamless transition from the first display mode to the second display mode.

As represented by block 422, in some implementations, the method 400 includes detecting completion of the processing the first object data before transitioning to the second display mode. For example, with reference to FIG. 3, the compositing subsystem 340 obtains a processing termination indicator from the processing subsystem 356 before sending the second display data 342 to the display 380. As one example, the processing termination indicator is part of a fencing process (e.g., implemented at an operating system (OS) level), and the processing termination indicator is used to facilitate the scheduling of multiple animation processes relative to each other. As one example, based on detecting the request to change from the first display mode to the second display mode, the method 400 includes determining that a first animation process of increasing the 2D content region is ready to begin, and determining that a second animation process of increasing the size of the first object data is also ready to begin. In order to provide a seamless transition from the first display mode to the second display mode, one of the animation processes registers a fence with the OS, and pauses starting its animation. Moreover, the animation process sends a processing termination indicator (e.g., a fence identifier) to the other animation process, thereby signaling to the other animation process to also register a fence with the OS and pause starting its animation. Once the OS receives both fences, the OS can lift the fences and concurrently start the animation processes in order to enable the seamless transition from the first display mode to the second display mode.

Figure 5:
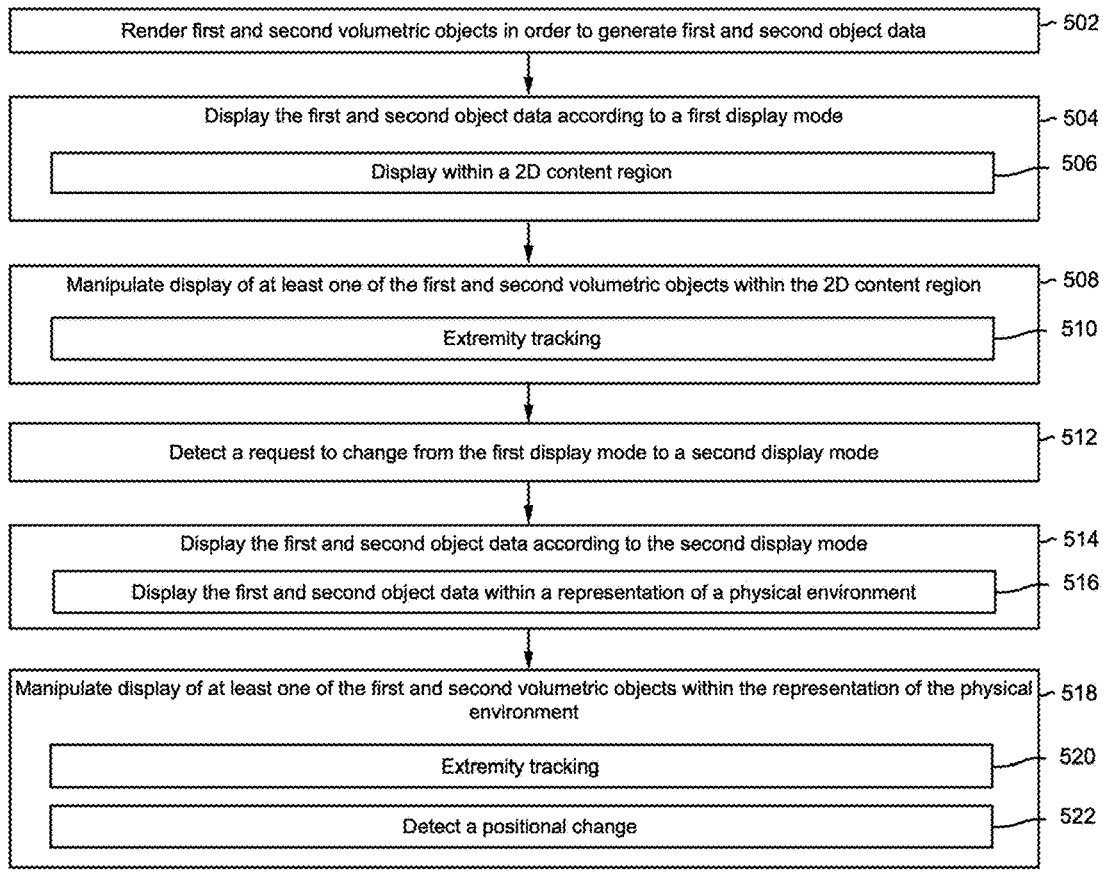
FIG. 5 is an example of a flow diagram of a method of manipulating rendered volumetric objects in accordance with some implementations.

FIG. 5 is an example of a flow diagram of a method 500 of manipulating rendered volumetric objects in accordance with some implementations. In various implementations, the method 500 or portions thereof are performed by an electronic device (e.g., the electronic device 210). In various implementations, the method 500 or portions thereof are performed by the system 310 illustrated in FIG. 3. In various implementations, the method 500 or portions thereof are performed by a mobile device, such as a smartphone, tablet, or wearable device. In various implementations, the method 500 or portions thereof are performed by a HMD including a display. In some implementations, the method 500 is performed by processing logic, including hardware, firmware, software, or a combination thereof. In some implementations, the method 500 is performed by a processor executing code stored in a non-transitory computer-readable medium (e.g., a memory).

As represented by block 502, the method 500 includes rendering a first volumetric object in order to generate first object data, and rendering a second volumetric object in order to generate second object data. For example, with reference to FIG. 3, the rendering subsystem 352 obtains a first volumetric object and a second volumetric object from the volumetric object(s) datastore 350. Moreover, the rendering subsystem 352 generates a first portion of the object data 354 corresponding to the first volumetric object, and generates a second portion of the object data 354 corresponding to the second volumetric object.

As represented by block 504, the method 500 includes displaying the first object data and the second object data according to a first display mode. As represented by block 506, the first display mode includes displaying the first object data and the second object data within a 2D content region. For example, with reference to FIG. 2B, the electronic device 210 displays, within the 2D content region 220, the first object data (corresponding to the volumetric car 222) and the second object data (corresponding to the volumetric fruit bowl 224).

As represented by block 508, in some implementations, the method 500 includes manipulating display of at least one of the first volumetric object and the second volumetric object within the 2D content region. To that end, the method 500 includes updating rendering the first object based on a manipulation input in order to generate updated first object data, and replacing, on the display, the first object data with the updated first object data. For example, an electronic device receives the manipulation input via one or more input devices.

As one example, as represented by block 510 and with reference to FIG. 3, the extremity tracker 362 receives the manipulation input 368, and outputs corresponding extremity tracking data to the rendering subsystem 352. The extremity tracker 362 tracks an extremity of a user, such as a finger or hand of the user. In some implementations, the manipulation input is spatially directed to a particular volumetric object on the display. For example, the manipulation input is less than a threshold distance away from a particular volumetric object. As one example, with reference to FIGS. 2C and 2D, the electronic device 210 receives the first manipulation input 240 directed to the volumetric table 226, and accordingly updates the rendering of the volumetric table 226 in order to rotate the volumetric table 226.

As represented by block 512, the method 500 includes detecting a request to change from the first display mode to a second display mode, such as is described with reference to block 412 of the method 400 illustrated in FIG. 4. As represented by block 514, in response to detecting the request, the method 400 includes displaying the first object data and the second object data according to the second display mode. As represented by block 516, the second display mode includes displaying the first object data and the second object data within a representation of a physical environment. For example, in response to receiving the second request 244 in FIG. 2G, the electronic device 210 displays, within the representation of the physical environment 200, the second object data (corresponding to the volumetric fruit bowl 224) and the third object data (corresponding to the volumetric table 226). Additional details regarding displaying object data within a representation of a physical environment are described with reference to block 420 of the method 400 illustrated in FIG. 4.

As represented by block 518, in some implementations, the method 500 includes manipulating display of at least one of the first volumetric object and the second volumetric object within the representation of the physical environment. For example, as represented by block 520, the method 500 includes utilizing extremity tracking in order to manipulate a particular volumetric object. As one example, with reference to FIGS. 2I and 2J, the electronic device 210 receives the second manipulation input 246 directed to the volumetric fruit bowl 224, and accordingly updates the rendering of the volumetric fruit bowl 224 in order to move the volumetric fruit bowl 224 leftwards across the surface of the physical credenza 204.

As another example, as represented by block 522, the method 500 includes detecting a positional change of an electronic device in order to manipulate a particular volumetric object. For example, with reference to FIG. 3, the positional sensor 364 receives the manipulation input 368, and outputs corresponding device positional data to the rendering subsystem 352. For example, the positional data indicates a rotational movement or a translational movement of an electronic device. For example, the positional sensor 364 corresponds to an IMU that detects a rotational and/or positional change of the system 310. As another example, with reference to FIG. 2J, were the user 50 to walk closer to the physical wall 202, the electronic device 210 would update rendering of the second object data in order to enlarge the appearance of the volumetric fruit bowl 224, and update rendering of the third object data in order to enlarge the appearance of the volumetric table 226.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be implemented in such program instructions, although some or all of the disclosed functions may alternatively be implemented in application-specific circuitry (e.g., ASICs or FPGAs or GP-GPUs) of the computer system. Where the computer system includes multiple computing devices, these devices may be co-located or not co-located. The results of the disclosed methods and tasks may be persistently stored by transforming physical storage devices, such as solid-state memory chips and/or magnetic disks, into a different state.

Various processes defined herein consider the option of obtaining and utilizing a user's personal information. For example, such personal information may be utilized in order to provide an improved privacy screen on an electronic device. However, to the extent such personal information is collected, such information should be obtained with the user's informed consent. As described herein, the user should have knowledge of and control over the use of their personal information.

Personal information will be utilized by appropriate parties only for legitimate and reasonable purposes. Those parties utilizing such information will adhere to privacy policies and practices that are at least in accordance with appropriate laws and regulations. In addition, such policies are to be well-established, user-accessible, and recognized as in compliance with or above governmental/industry standards. Moreover, these parties will not distribute, sell, or otherwise share such information outside of any reasonable and legitimate purposes.

Users may, however, limit the degree to which such parties may access or otherwise obtain personal information. For instance, settings or other preferences may be adjusted such that users can decide whether their personal information can be accessed by various entities. Furthermore, while some features defined herein are described in the context of using personal information, various aspects of these features can be implemented without the need to use such information. As an example, if user preferences, account names, and/or location history are gathered, this information can be obscured or otherwise generalized such that the information does not identify the respective user.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various implementations described above can be combined to provide further implementations. Accordingly, the novel methods and systems described herein may be implemented in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed:

1. A method comprising: at an electronic device including one or more processors, a non-transitory memory, and a display: rendering a three-dimensional (3D) object model of a first object in order to generate two-dimensional (2D) image data of the first object and a 3D object model of a second object in order to generate 2D image data of the second object; displaying, on the display, the 2D image data of the first object and the 2D image data of the second object according to a first display mode, wherein the first display mode includes displaying the 2D image data of the first object and the 2D image data of the second object within a 2D content region, and wherein in the first display mode the display does not include a representation of a physical environment; while the 2D image data of the first object is displayed according to the first display mode: receiving a manipulation input via one or more input devices; and rendering the 3D object model of the first object based on the manipulation input to generate updated 2D image data of the first object; displaying, on the display, the updated 2D image data of the first object according to the first display mode; and in response to detecting a request to change from the first display mode to a second display mode, displaying, on the display, the updated 2D image data of the first object according to the second display mode, wherein the second display mode includes displaying the updated 2D image data of the first object within the representation of the physical environment and ceasing to display the 2D content region.

2. The method of claim 1, wherein displaying the 2D image data of the first object according to the first display mode includes:
obtaining 2D content data that indicates the 2D content region;
combining the 2D content data with the 2D image data of the first object in order to generate first display data, wherein the first display data indicates the first object within the 2D content region; and
sending the first display data to the display.

3. The method of claim 1, wherein the electronic device includes an image sensor, and wherein displaying the updated 2D image data of the first object according to the second display mode includes:
capturing, via the image sensor, image data characterizing the physical environment, wherein the image data indicates the representation of the physical environment;
compositing the image data with the updated 2D image data of the first object in order to generate second display data, wherein the second display data indicates the first object within the representation of the physical environment; and
sending the second display data to the display.

4. The method of claim 2, wherein the 2D content data further indicates 2D content that is within the 2D content region.

5. The method of claim 4, wherein displaying the 2D image data of the first object within the 2D content region includes displaying the 2D image data of the first object in-line with respect to the 2D content.

6. The method of claim 1, further comprising:
in further response to detecting the request, processing the updated 2D image data of the first object; and
detecting completion of the processing before displaying the updated 2D image data of the first object according to the second display mode.

7. The method of claim 1, wherein the one or more input devices includes a positional sensor that receives the manipulation input, and wherein the positional sensor detects a positional change of the electronic device based on the manipulation input.

8. The method of claim 1, wherein the manipulation input is spatially directed to the 2D image data of the first object.

9. The method of claim 1, wherein detecting the request includes receiving an input directed to the 2D image data of the first object displayed within the 2D content region.

10. The method of claim 1, wherein the second display mode corresponds to an augmented reality (AR) environment or mixed reality (MR) environment.

11. A system comprising: a display; non-transitory memory; and one or more processors to: render a three-dimensional (3D) object model of a first object in order to generate two-dimensional (2D) image data of the first object and a 3D object model of a second object in order to generate 2D image data of the second object; display, on the display, the 2D image data of the first object and the 2D image data of the second object according to a first display mode, wherein the first display mode includes displaying the 2D image data of the first object and the 2D image data of the second object within a 2D content region, and wherein in the first display mode the display does not include a representation of a physical environment; while the 2D image data of the first object is displayed according to the first display, mode: receive a manipulation input via one or more input devices; and render the 3D object model of the first object based on the manipulation input to generate updated 2D image data of the first object display, on the display, the updated 2D image data of the first object according to the first display mode; and in response to detecting a request to change from the first display mode to the second display mode, display, on the display, the updated 2D image of the first object according to the second display mode, wherein the second display mode includes displaying the updated 2D image of the first object within the representation of the physical environment and ceasing to display the 2D content region.

12. The system of claim 11, wherein the one or more processors are to display the 2D image data of the first object according to the first display mode by combining the 2D image data of the first object with 2D content data, and wherein the one or more processors are to display the updated 2D image data of the first object according to the second display mode by compositing the updated 2D image data of the first object with image data of the physical environment.

13. The system of claim 12, wherein the system comprises an image sensor that captures the image data of the physical environment.

14. The system of claim 11, wherein the one or more processors are further to process the updated 2D image data of the first object based on detection of the request.

15. A non-transitory computer readable storage medium storing one or more programs, the one or more programs comprising instructions, which, when executed by an electronic device including a display, cause the electronic device to: render a three-dimensional (3D) object model of a first object in order to generate two-dimensional (2D) image data of the first object and a 3D object model of a second object in order to generate 2D image data of the second object; display, on the display, the 2D image data of the first object and the 2D image data of the second object according to a first display mode, wherein the first display mode includes displaying the 2D image data of the first object and the 2D image data of the second object within a 2D content region, and wherein in the first display mode the display does not include a representation of a physical environment; while the 2D image data of the first object is displayed according to the first display mode: receive a manipulation input via one or more input devices; render the 3D object model of the first object to generate updated 2D image data of the first object before detecting a request to change from the first display mode to a second display mode; display, on the display, the updated 2D image data of the first object according to the first display mode: and in response to detecting a request to change from the first display mode to the second display mode, display, on the display, the updated 2D image data of the first object according to the second display mode, wherein the second display mode includes displaying the updated 2D image data of the first object within the representation of the physical environment and ceasing to display the 2D content region.

16. The method of claim 1, further comprising, in response to detecting the request to change from the first display mode to the second display mode, activating an image sensor that captures image data corresponding to the representation of the physical environment, wherein the image sensor is inactive in the first display mode.

17. The method of claim 1, wherein the manipulation input corresponds to a rotation of the first object.

18. The system of claim 11, wherein the one or more input devices includes a positional sensor that receives the manipulation input, and wherein the positional sensor detects a positional change of the system based on the manipulation input.

19. The system of claim 11, wherein the manipulation input is spatially directed to the 2D image of the first object.

* * * * *